(12) United States Patent
Osiyemi et al.

(10) Patent No.: US 9,555,596 B2
(45) Date of Patent: Jan. 31, 2017

(54) HONEYCOMB STRUCTURE

(71) Applicant: ROLLS-ROYCE PLC, London (GB)

(72) Inventors: Stephen Osiyemi, Derby (GB); Ian Colin Deuchar Care, Derby (GB)

(73) Assignee: ROLLS-ROYCE plc, London (GB)

( * ) Notice: Subject to any disclaimer, the term of this patent is extended or adjusted under 35 U.S.C. 154(b) by 93 days.

(21) Appl. No.: 14/601,927

(22) Filed: Jan. 21, 2015

(65) Prior Publication Data

US 2015/0231853 A1    Aug. 20, 2015

(30) Foreign Application Priority Data

Feb. 17, 2014    (GB) .................................. 1402732.0

(51) Int. Cl.
*B32B 3/12*    (2006.01)

(52) U.S. Cl.
CPC ............ *B32B 3/12* (2013.01); *B32B 2307/102* (2013.01); *B32B 2307/304* (2013.01); *B32B 2605/18* (2013.01); *Y10T 428/24157* (2015.01)

(58) Field of Classification Search
CPC .............................................. Y10T 428/1234
See application file for complete search history.

(56) References Cited

U.S. PATENT DOCUMENTS

| 5,021,282 A | 6/1991 | Terry et al. |
| 5,490,892 A | 2/1996 | Castagnos et al. |

FOREIGN PATENT DOCUMENTS

WO    00/48807 A1    8/2000

OTHER PUBLICATIONS

Jul. 31, 2014 Search Report issued in British Application No. 1402732.0.
Jun. 30, 2015 Extended European Search Report issued in Application No. 15151745.5.

*Primary Examiner* — Adam Krupicka
(74) *Attorney, Agent, or Firm* — Oliff PLC

(57) ABSTRACT

A honeycomb structure comprising a core and at least one face sheet. The core having a honeycomb configuration comprising an array of hollow cells formed between a network of walls. The or each face sheet having a plurality of outwardly directed protrusions. The or each face sheet being affixed to the core to cover the hollow cells with each said protrusion being received within a respective region of the core and bonded to the core.

16 Claims, 5 Drawing Sheets

HONEYCOMB STRUCTURE

The present invention relates to a honeycomb structure, and more particularly relates to a honeycomb structure of a type having a core of honeycomb configuration and at least one face sheet affixed to the core.

BACKGROUND

Honeycomb structures such as honeycomb sandwich panels are widely known and are used in various different fields such as, for example, commercial and military aircraft, marine vessels, automobiles, buildings and construction, sporting equipment and even toys.

A typical prior art honeycomb sandwich panel consists of two relatively stiff and thin face sheets made from a dense material such as metal or fibre composite which is adhesively or otherwise bonded to a relatively thick and light honeycomb core. FIG. 1 illustrates schematically a pair of such face sheets 1, 2 and a honeycomb core 3. As is conventional, the honeycomb core is made up from a network of thin walls 4, which in the illustrated arrangement is provided in the form of a square grid arrangement. The network of walls thus defines a plurality of discrete hollow cells 5 between individual walls 4. The cells 5 may be columnar. As will be recognised by those of skill in the art, other configurations for the network of walls 4, and thus the resulting cells 5, are also possible, and indeed configurations having hexagonally shaped cells 5 are widely used; such arrangements clearly being most directly suited to the general term "honeycomb structure" on account of sharing their shape and configuration with natural honeycombs from which the term derives. FIG. 1 illustrates the two face sheets 1, 2 being offered up to respective opposite sides of the honeycomb core 3 for bonding to the core. FIG. 2 illustrates the completed structure.

Honeycomb panels are commonly used in situations where saving weight in a structure is important. They offer considerably higher strength-to-weight and stiffness-to-weight ratios than alternative solid panels of similar weight, size and geometry. Additionally, honeycomb panels are well suited to use in acoustic damping and thermal insulation.

It is for these reasons that acoustic liners for the engine casings of modern gas turbine engines in the aeronautical industry are fabricated from honeycomb panels of the general type described above. In particular, such acoustic liners are often fabricated using a fibre (such as glass, nylon, etc.) reinforced plastic or aluminium perforate front face sheet bonded to one side of an aluminium honeycomb core, with a glass reinforced plastic rear sheet bonded to the opposite side of the core. However problems can arise with such panels which are attributable to their basic construction.

It has been found that currently used designs of honeycomb panels have their strength and durability limited by the strength of the bond, which as explained above is usually created by the use of adhesive, which exists between each face sheet and the honeycomb core. This is because the strength of the bond between each face sheet and the core is determined by the total contact area over which the adhesive can effectively bond the face sheet and the core together.

As will be appreciated from FIG. 1, the actual contact area presented by the network of thin walls 4 is very small in comparison to the overall area of the core 3 and the face sheets 1, 2; simply due to the thin configuration of the walls 4. Additionally, the bond between the core 3 and each face sheet 1, 2 provided by adhesive applied to the ends of the thin walls 4 will be subject to peel and tensile forces in the use of many panels fabricated in the conventional manner.

Although it is common to apply the adhesive in the form of a fillet, the total area available for the fillet is often small and is dependent on the ability of the adhesive to form a meniscus along the cell walls due to capillary action and/or the tendency of some parts of the cell wall to sink into the film or paste adhesive used for the bonding. However, it is worthy to note that if thicker fillets of adhesive are used in an attempt to counteract this problem, there can often be a tendency for the adhesive to completely encapsulate the honeycomb structure of the core 3, which reduces the weight saving advantage of using a honeycomb structure.

Fabricating acoustic liner panels in the above-described prior art manner is very expensive and time consuming because of the care which must be taken when applying the adhesive to prevent it plugging the perforations which are usually provided in the front face sheets for such panels, which of course would reduce the panel's noise damping effect. To avoid this problem, the adhesive must be applied to the face sheet, or to the ends of the walls 4 of the core in a carefully reticulated manner, which is not only time consuming but also results in a reduction in the total contact area of the bond.

In addition, the adhesive bond formed between the honeycomb and the mating face sheets in the prior art panels are readily exposed to the risk of chemical hydrolysis of the adhesive and or corrosion of the bonding interface due to ingress and entrapment of water, lubricating oils or moisture around the bond. The resultant effect of either or both of these phenomena is a significantly lowered bond strength and service life of the honeycomb structure.

There is therefore a need for a honeycomb structure which is less susceptible to the above-mentioned problems and which, in particular is stronger and more durable than previous structures.

SUMMARY OF INVENTION

It is an object of the present invention to provide an improved honeycomb structure.

According to the present invention, there is provided a honeycomb structure comprising a core and at least one face sheet, the core having a honeycomb configuration comprising an array of hollow cells formed between a network of walls, and the or each face sheet having a plurality of outwardly directed protrusions and being affixed to the core to cover the hollow cells with each said protrusion being received within a respective region of the core and bonded to the core.

Advantageously, each said protrusion is adhesively bonded to the core.

Optionally, the honeycomb structure has two said face sheets, the face sheets being affixed to opposite sides of the core.

A plurality of openings may be formed within the network of walls of the core, and each said protrusion is received and bonded within a corresponding said opening.

Optionally, the or each said face sheet is affixed to said core only by bonds provided between said protrusions and said openings.

Said openings may be configured to receive said protrusions therein as a sliding fit prior to bonding.

Each said opening may be formed in a respective wall within said network of walls.

Optionally, each said opening is provided in the form of a blind hole.

Said protrusions and said openings may be of complementary shape and configuration.

Said protrusions may be each substantially planar, and said openings may be each elongate for the receipt of a respective protrusion.

Optionally, the or each said face sheet is affixed to the core so as to abut the ends of said walls, and each said opening is provided through the end of a respective wall.

The structure may have two said face sheets with each being affixed to the core so as to abut respective opposite ends of said walls, said openings each being provided in the form of an aperture extending through a respective wall from one end to the other, and each said aperture receiving a protrusion of each face sheet.

Optionally, said hollow cells are substantially rectangular in shape and are each bounded by four said walls, at least two of which are provided with respective openings. Alternatively, each of said four walls may be provided with respective openings.

Said hollow cells may be substantially square.

The or each said face sheet and its protrusions may be formed from plastics material, said protrusions being provided as integrally moulded features of the face sheet.

Alternatively, the or each face sheet and its protrusions may be formed from a metallic material, said protrusions being welded to the face sheet.

DESCRIPTION OF THE DRAWINGS

So that the invention may be more readily understood, and so that further features thereof may be appreciated, embodiments of the invention will now be described by way of example with reference to the accompanying drawings in which.

DETAILED DESCRIPTION

Figure 3:
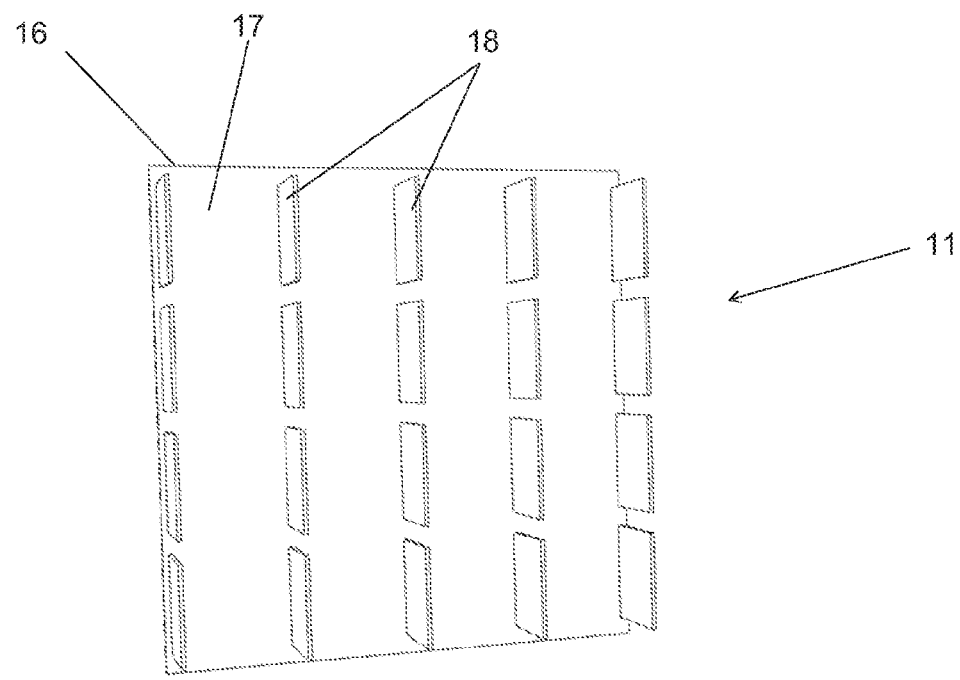
FIG. 3 is a perspective view of a face sheet used to form a honeycomb structure.
Figure 4:
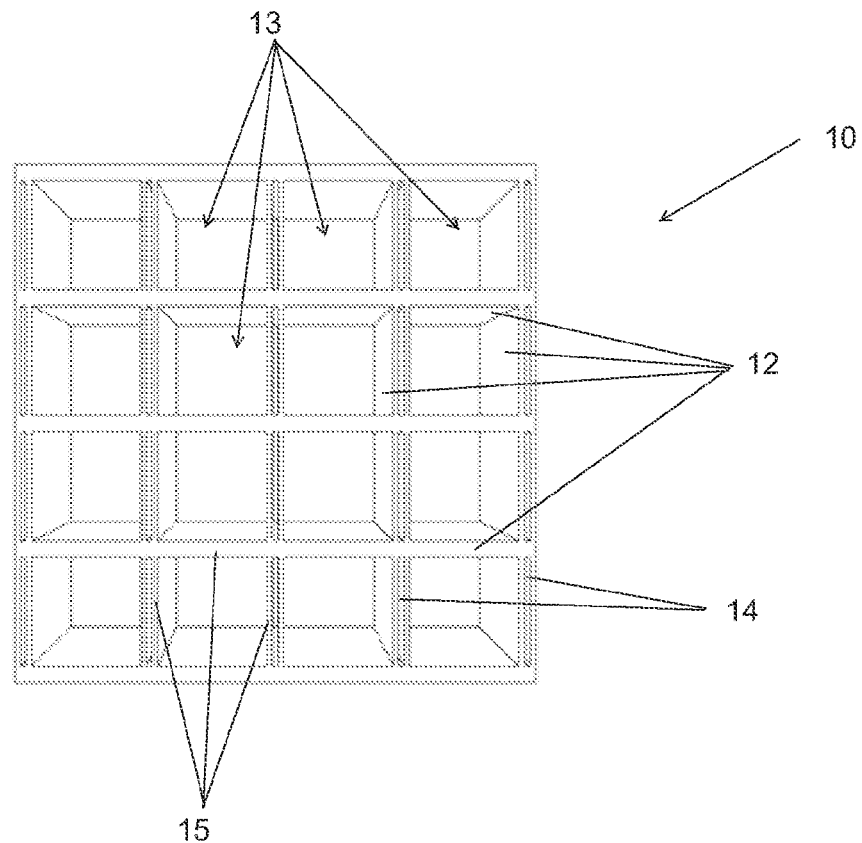
FIG. 4 is a perspective view from above showing a honeycomb core used to form the honeycomb structure.
Figure 5:
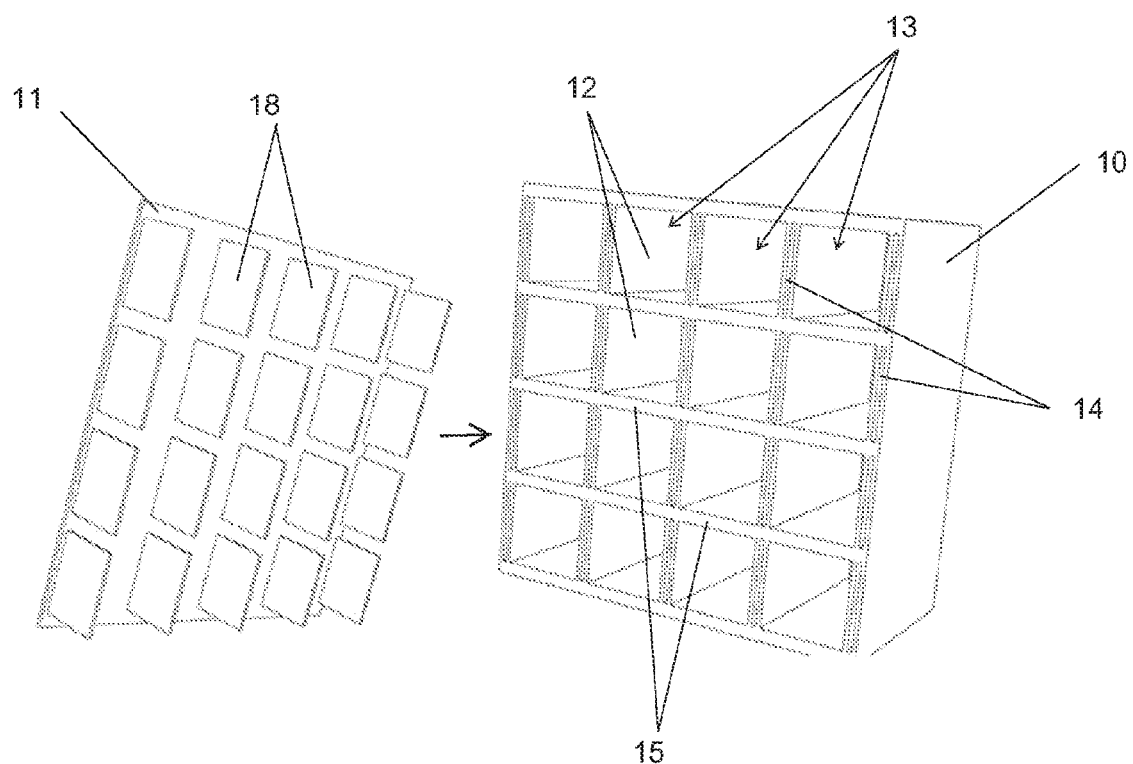
FIG. 5 is a perspective view showing the face sheet of FIG. 3 and the core of FIG. 4 being affixed to one another.

Turning now to consider FIGS. 3 to 5 in more detail, there are shown a honeycomb core 10 and a face sheet 11 which are used to form a honeycomb structure in accordance with a first embodiment of the present invention.

The honeycomb core 10 comprises a network of thin walls 12, which in the embodiment illustrated are arranged in the form of a square grid of orthogonally intersecting horizontally and vertically extending (in the specific orientation of the core shown in FIG. 4) webs. As will therefore be noted, a plurality of hollow cells 13 are thus defined between the walls 4, the cells 13 being arranged in a regular array. The cells 13 are generally square in form due to the arrangement of the network of walls 4, and are columnar in the sense that they have a length corresponding to the depth of the core 10, which is shown extending into the page in the orientation of the core illustrated in FIG. 4. It is to be noted, however, that whilst the embodiment illustrated in FIGS. 3 to 5, and also other embodiments described below, are configured such that the cells 13 are generally square in form in cross-section, other shapes of cells are also possible such as, for example, elongate rectangular cells, triangular, pyramidal, pentagonal, octagonal, hexagonal cells of similar form to those found in natural honeycombs from which the term "honeycomb structure" derives, or even combinations of two of more such cell configurations such as a combination of pentagonal and triangular cells provided in an array. Square cells 13 are illustrated herein merely for the sake of simplicity.

In contrast to the cores of prior art honeycomb structures, the core 13 has a plurality of discrete openings 14, the openings 14 being provided within the network of walls 12 and thus being provided in addition to the cells 13 defined between the walls 12. More specifically, it will be noted that in the embodiment illustrated, the openings 14 are provided within respective individual walls 12 of the core 10.

In the embodiment illustrated in FIG. 4, the openings 14 are provided in only respective vertically extending walls 12, such that the horizontally extending walls have no such openings. This means that each cell 13 is associated with two openings 14 on opposite sides of the cell. Furthermore, it will be noted that each opening 14 is provided in the form of a narrow elongate slot extending along substantially the entire extent of its respective wall 12. Each opening 14 may either be provided in the form of a recess or blind hole which is open through only one end 15 of its respective wall 12, or alternatively (as will be described in more detail below) may be provided in the form of an aperture extending completely through its respective wall 12 from one end to the other so as to be open through both ends 15 (only one end being visible in FIG. 4) of the wall.

The face sheet 11 illustrated comprises a generally planar panel 16 having a front side (not shown) and a rear side 17. A plurality of spaced-apart protrusions 18 extend outwardly from the rear side 17 of the panel 16. The protrusions 18 are each planar in form and extend orthogonally from the rear side 17 of the panel 16, in a series of spaced-apart lines, such that the protrusions 18 in each line are coplanar with one another.

The face sheet 11 may be formed from plastics material, such as glass reinforced plastic, in which case it is envisaged that the protrusions will be moulded as integral features of the panel 16. Alternatively, the face sheet may be formed from metal, such as aluminium, in which case it envisaged that the protrusions 18 will be welded, brazed, or joined to the panel 16.

As will be noted, having regard to both FIGS. 3 and 4, the protrusions 18 are arranged in an identical array to that in which the openings 14 of the core 10 are arranged. Furthermore, the protrusions 18 and the openings 14 are shaped and configured such that each protrusion 18 may be received as a sliding fit within a respective opening 14. In this regard, it is considered advantageous for the sliding fit between the protrusions and the openings to be somewhat loose rather than close and tight; for example with a clearance of approximately 0.1 mm.

FIG. 5 shows the core 10 and the face sheet 11 ready for fixture to one another in order to assemble a structure in accordance with the present disclosure. Prior to assembly, it is proposed to clean the surfaces of the protrusions 18, and also the internal surfaces of the openings 14. The surfaces of the protrusions 18 and the openings 14 may also be treated in order to improve their acceptance of bonding adhesive. It is envisaged that this cleaning and surface treatment may performed via any convenient technique such as, for example: abrasion, anodising, acid etching, plasma or sol-gel treatment.

Following appropriate cleaning and surface treatment of the surfaces of both the protrusions 18 and the openings 14, adhesive is then applied either to the surfaces of the protrusions 18, or to the internal surfaces of the openings 14, or to both. It is envisaged that the adhesive will be applied in the form of a paste or a low-viscosity foaming film adhesive such that the entire extent of each surface is fully coated. It is not necessary, to apply any adhesive to the rear side 17 of the face sheet 11 or to the ends 15 of the walls 12 of the core 10.

When the adhesive has been applied as described above, the face sheet 11 is offered up to the core 10 such that its protrusions 18 each become aligned with a respective opening 14, whereupon the face sheet 11 can be pressed against the core 10 such that the protrusions 18 will slide into the openings 14, and so that the rear side 17 of the face sheet 11 will be brought into abutment with the ends 15 of the walls 12. The above-mentioned clearance arising from the somewhat loose fit of each protrusion 18 within its respective opening 14, as well as the capillary action from the viscous adhesive entrapped between narrow spaces, prevents the adhesive from being pushed out of the openings 14 as the protrusions are engaged with the openings, thereby ensuring that adhesive remains in the narrow space between each surface of the protrusions and the internal surfaces of the openings.

The adhesive is then cured, which may be achieved by the application of heat and/or pressure to the structure so as to create secure bonds between each protrusion 18 and its respective opening 14, thereby fixing the protrusions 18 within the openings 14 and thus securely bonding the face sheet 11 to the core 10.

Figure 1:
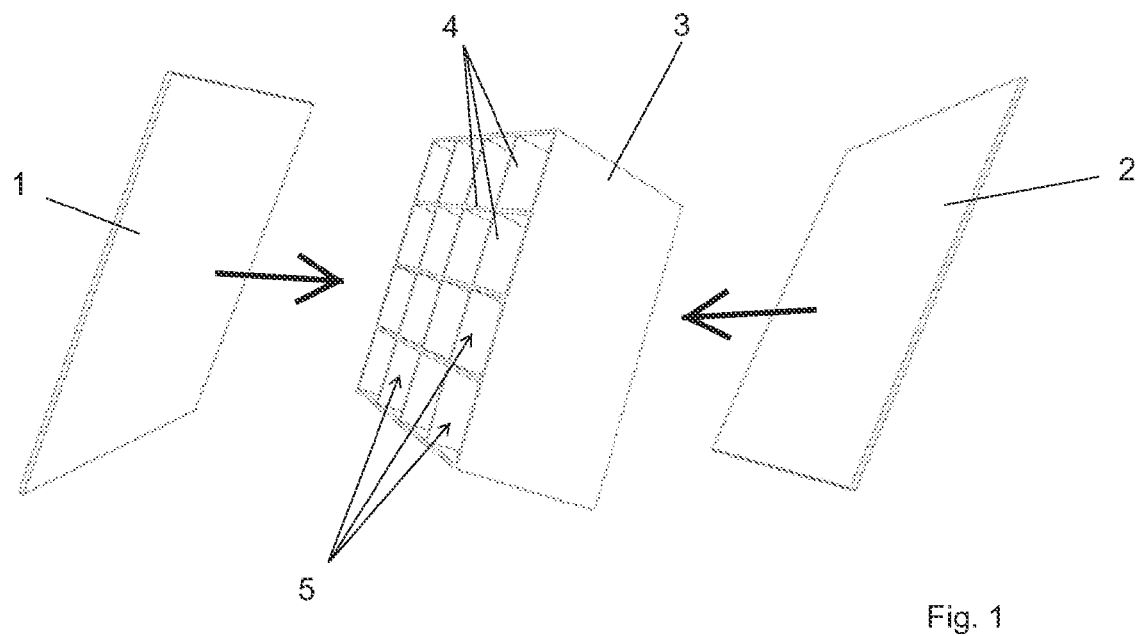
FIG. 1 (discussed above) is a schematic illustration showing the individual components used to form a prior art honeycomb structure.
Figure 2:
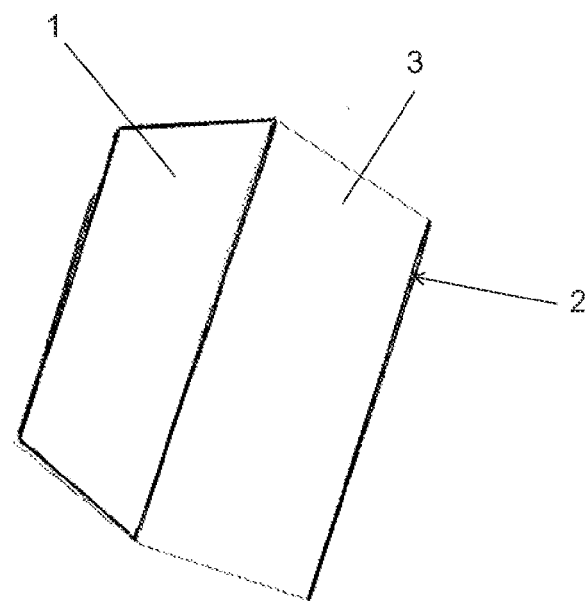
FIG. 2 (discussed above) is a perspective view of the completed prior art honeycomb structure illustrated in FIG. 2.

Because the face sheet 11 is bonded to the core 10 by the creation of a large number of individual bonds between the planar surfaces of the protrusions 18 and the internal surfaces of the openings 14, the bonded contact area between the face sheet 11 and the core 10 is very significantly larger than in the type of prior art structure illustrated in FIGS. 1 and 2 in which the bonding adhesive is applied only along the end surfaces of the walls of the core. Additionally, the bonds formed between the surfaces of the protrusions 18 and the internal surfaces of the openings 14 will act in shear rather than in peel in the event that the structure of the disclosure is subjected to forces tending to pull the face sheet 11 away from the core 10. The above-described honeycomb structure of the present disclosure is thus significantly stronger and less susceptible to failure in use than prior art honeycomb structures of the type illustrated in FIG. 5.

Also, because of the large bonding area provided between the surfaces of the protrusions 18 and the internal surfaces of the openings 14, it is possible in some embodiments to eliminate the application of any adhesive between the ends 15 of the walls 12 and the rear side surface 17 of the face sheet 11. This can have significant benefits in the event that the face sheet 11 is perforated, for example in the case that the panel is to be used for acoustic damping purposes, because the adhesive applied to the protrusions 18 and/or the openings 14 can be kept well away from the perforations through the panel 16, thereby avoiding the risk of the perforations becoming blocked by adhesive during fabrication of the structure. It is thus possible to fabricate the structure of the present disclosure without the sort of reticulation techniques required when applying adhesive to form the prior art structures.

Furthermore, the present disclosure provides a significant improvement in the service life of the honeycomb structure because in comparison to the prior art, the embedded adhesive between the mating protrusions and the internal walls of the openings is significantly shielded and protected from the risk of chemical hydrolysis of the adhesive and/or corrosion of the bonding interface due to ingress and entrapment of water, lubricating oils or moisture around the bond during use of the structure for its intended purpose. The resultant effect is that it takes a much longer time for any fluid to diffuse into the bonding interface and cause the above-mentioned chemical reactions that may degrade the bond because the adhesive is shielded by the cell walls.

Of course, whilst the embodiment of FIGS. 3 to 5 has been described above with reference to the fixture of a single face sheet 11 to one side of the core 10, it is to be appreciated that a second similar face sheet 11 could be affixed to the opposite side of the core 10 in a similar way. For example, in an arrangement in which the openings 14 are provided in the form of recesses or blind holes in the walls 12, another corresponding set of such openings 14 could be provided through the opposite ends (not shown) of the walls for the receipt of similar protrusions on the second face sheet (also not shown). Alternatively, as mentioned above, the openings 14 could be provided in the form of apertures extending through the entire length of the walls 12 from one end 15 to the other, in which case the protrusions of the first face sheet 11 will be received in one end region of the apertures, and the protrusions of the second face sheet will be received in the opposite end region of the apertures. The protrusions could even overlap one another within each aperture.

Figure 6:
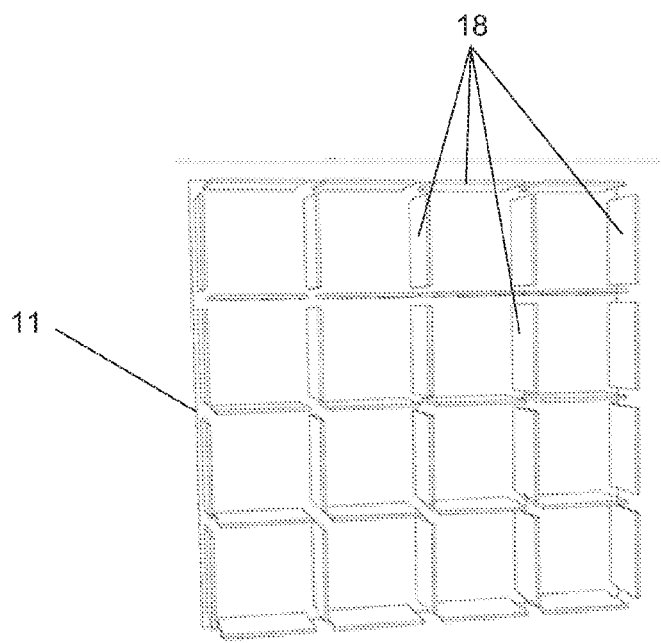
FIG. 6 is a view similar to that of FIG. 3, but which shows an alternative configuration of face sheet used to form a honeycomb structure in accordance with a second embodiment.
Figure 7:
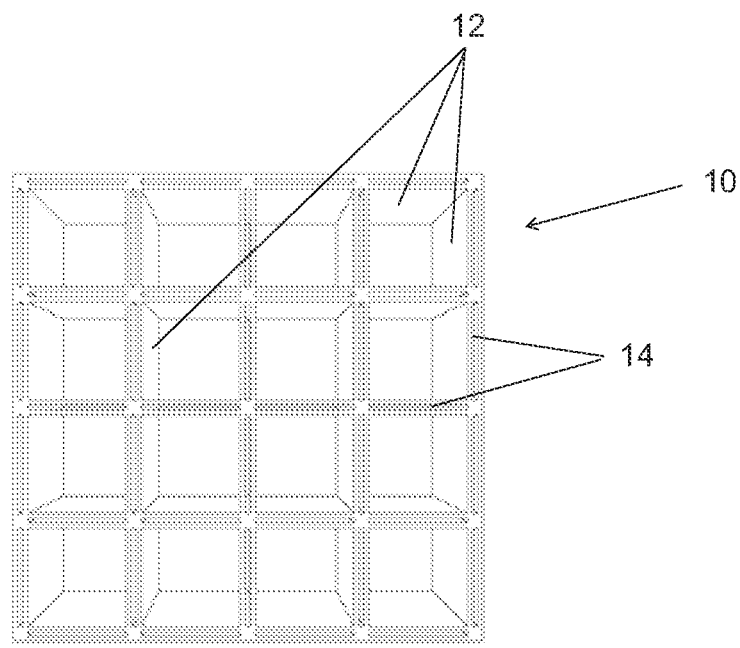
FIG. 7 is a view similar to that of FIG. 4, but which shows an alternative configuration of honeycomb core used to form the honeycomb structure of the second embodiment.
Figure 8:
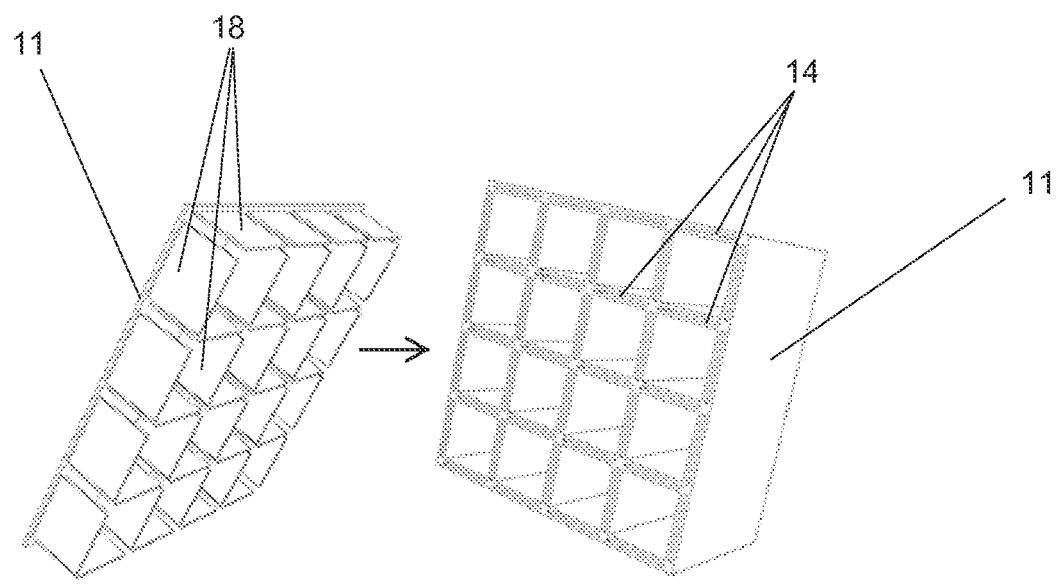
FIG. 8 is a view similar to that of FIG. 5, but which shows the face sheet of FIG. 6 and the core of FIG. 7.

Turning now to consider FIGS. 6 to 8, an alternative embodiment is illustrated. As will be immediately apparent from the drawings, this embodiment is largely similar to the one described above, with the only significant difference being the number openings 14 and protrusions and their distribution.

In the embodiment of FIGS. 6 to 8, the core 10 is of generally identical configuration to the one of the previously described embodiment, except it is now provided with openings 14 in every wall 12 making up the network. As will therefore be noted, in the orientation shown in FIG. 7, openings 14 are provided in the vertically extending walls 12 as well as the horizontally extending walls, such that each cell 13 of the core is associated with four openings—one on each side of the cell 13. Similarly, the face sheet 11 also has a more protrusions 18, the protrusions 18 being arranged in both horizontal and vertically extending rows in square grid formation to correspond to the shape and configuration of the array of openings 14 in the core 10.

Assembly of the alternative structure illustrated in FIGS. 6 to 8 is generally identical to that described above in connection with the embodiment of FIGS. 3 to 5, but of course it will be appreciated that when the structure is fully formed, there will be a significant increase in overall bond strength between the face sheet 11 and the core 10 due to the significant increase in bond area provided by the increased number of protrusions 18 and corresponding openings 14.

Figure 9:
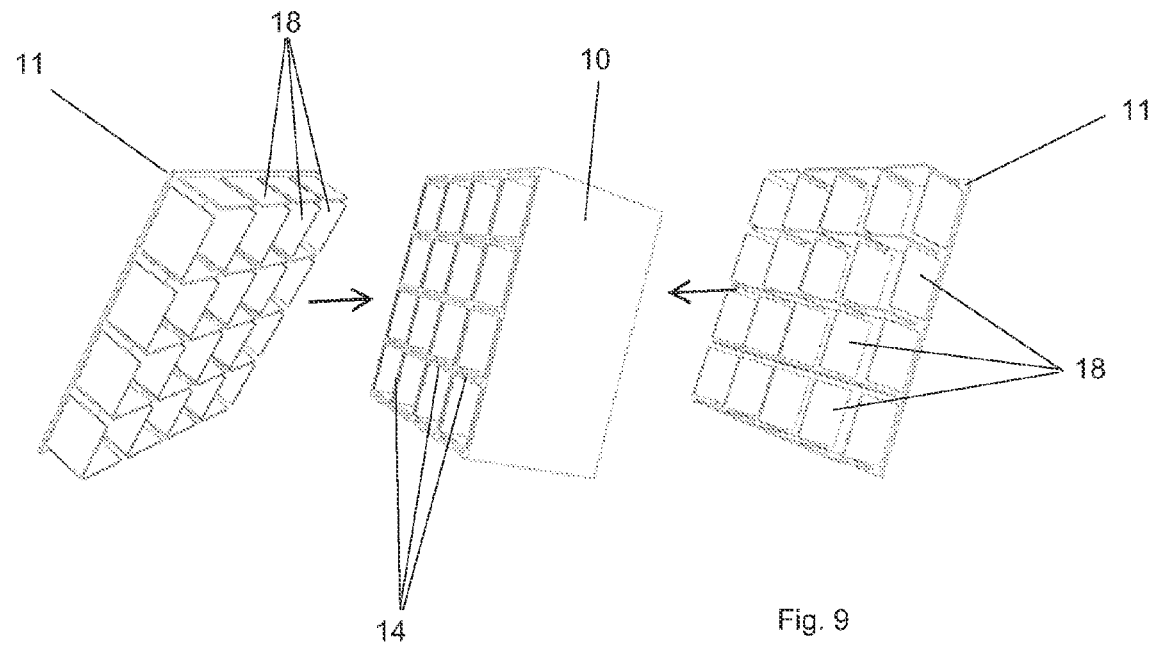
FIG. 9 is a perspective view illustrating two face sheets and a honeycomb core used to form a honeycomb structure in accordance with a third embodiment.
Figure 10:
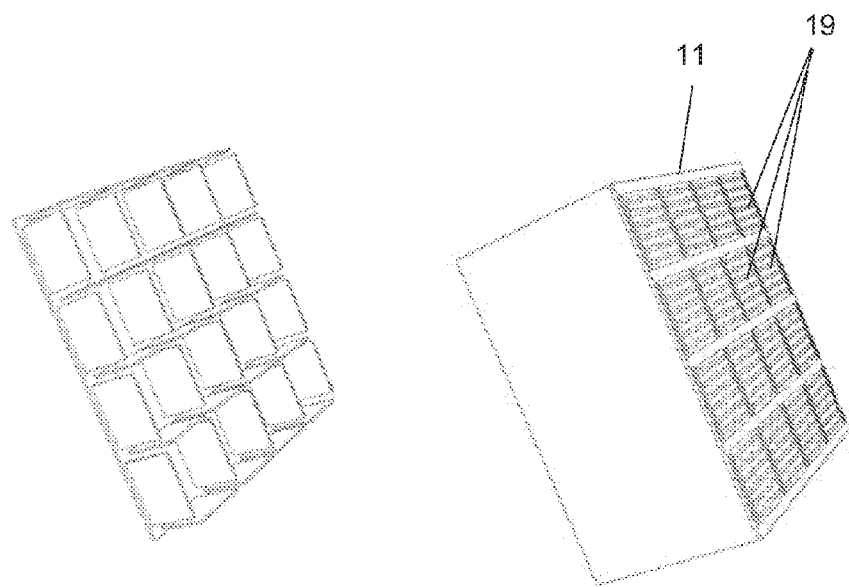
FIG. 10 is a perspective view showing a face sheet, and a honeycomb core with one other face sheet affixed to it, in accordance with a fourth embodiment.

FIGS. 9 and 10 illustrate another embodiment which comprises two face panels 11 affixed to opposite sides of the core 10 so as to abut opposite ends 15 of the walls 12, and which shares the type of distribution of projections 18 and corresponding openings 14 of the embodiment illustrated in FIGS. 6 to 8. As will be appreciated, as explained above in connection with the arrangement shown in FIGS. 3 to 5, in this arrangement the openings 14 can provided in the form of recesses or blind holes in opposite ends of the walls 12, or alternatively the openings 14 can be provided in the form of apertures extending through the entire length of the walls 12 from one end 15 to the other, in which case the protrusions of the first face sheet 11 will be received in one end region of the apertures, and the protrusions of the second face sheet will be received in the opposite end region of the apertures. The protrusions could even overlap one another within each aperture.

FIG. 10 shows in more detail the configuration of one of the face sheets 11 which includes a plurality of perforated regions 19 which are each located between the positions of the protrusions 18 and are thus positioned for communication with respective cells 13 of the core therebehind.

Whilst the present invention has been described above with specific reference to particular embodiments, it is to be appreciated that various changes or modifications could be made without departing from the scope of the appended claims. For example, it is envisaged that the openings 14 provided in the cell walls 12, and the protrusions 18 on the or each face sheet could each be distributed in corresponding asymmetric arrays configured to permit the face sheet 11 to be connected to the core in only one orientation. This type of arrangement would have particular benefit in avoiding errors in the construction of structures in which a particular orientation of the or each face sheet relative to the core is important.

In the broadest sense of the present disclosure it may be possible actually to omit the discrete openings 14 which are described above as being provided within walls 12 of the core. In such an arrangement, the protrusions 18 on the or each face sheet 11 could instead be positioned and configured so as to slide across and bear against respective inner surfaces of the walls 12 inside the cells 13 of the core 11, and could thus be bonded to those cell inner surfaces by the use of similar adhesive. Such an arrangement would permit the use of thinner walls 12, thereby reducing the overall weight of the structure.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A structure comprising a core and at least one face sheet, the core having a configuration comprising an array of hollow cells formed between a network of walls, and the or each face sheet having a plurality of outwardly directed protrusions and being affixed to the core to cover the hollow cells with each said protrusion being received within a respective region of the core and bonded to the core, wherein a plurality of openings are formed within the network of walls of the core, and each said protrusion is received and bonded within a corresponding said opening.

2. A structure according to claim 1, wherein each said protrusion is adhesively bonded to the core.

3. A structure according to claim 1 having two said face sheets, the face sheets being affixed to opposite sides of the core.

4. A structure according to claim 1, wherein the or each said face sheet is affixed to said core only by bonds provided between said protrusions and said openings.

5. A structure according to claim 1, wherein said openings are configured to receive said protrusions therein as a sliding fit prior to bonding.

6. A honeycomb structure according to claim 1, wherein each said opening is provided in the form of a blind hole.

7. A structure according to claim 1, wherein said protrusions and said openings are of complementary shape and configuration.

8. A structure according to claim 7, wherein said protrusions are each substantially planar, and said openings are each elongate for the receipt of a respective protrusion.

9. A structure according to claim 1, wherein the or each said face sheet is affixed to the core so as to abut the ends of said walls, and each said opening is provided through the end of a respective wall.

10. A structure according to claim 9 having two said face sheets, the face sheets being affixed to opposite sides of the core, and wherein each said face sheet is affixed to the core so as to abut respective opposite ends of said walls, said openings each being provided in the form of an aperture extending through a respective wall from one end to the other, and each said aperture receiving a protrusion of each face sheet.

11. A structure according to claim 1, wherein said hollow cells are substantially rectangular in shape and are each bounded by four said walls, at least two of which are provided with respective openings.

12. A structure according to claim 11, wherein said hollow cells are substantially square.

13. A structure according to claim 1, wherein said hollow cells are substantially rectangular in shape and are each bounded by four said walls, each of said four walls being provided with respective openings.

14. A structure according to claim 1, wherein the or each said face sheet and its protrusions are formed from plastics material, said protrusions being provided as integrally moulded features of the face sheet.

15. A structure according to claim 1, wherein the or each face sheet and its protrusions are formed from a metallic material, said protrusions being welded to the face sheet.

16. A gas turbine engine comprising the structure according to claim 1.

* * * * *